June 29, 1954
J. UDELMAN
2,682,258
ROTARY INTERNAL-COMBUSTION ENGINE
Filed April 3, 1951
3 Sheets-Sheet 1
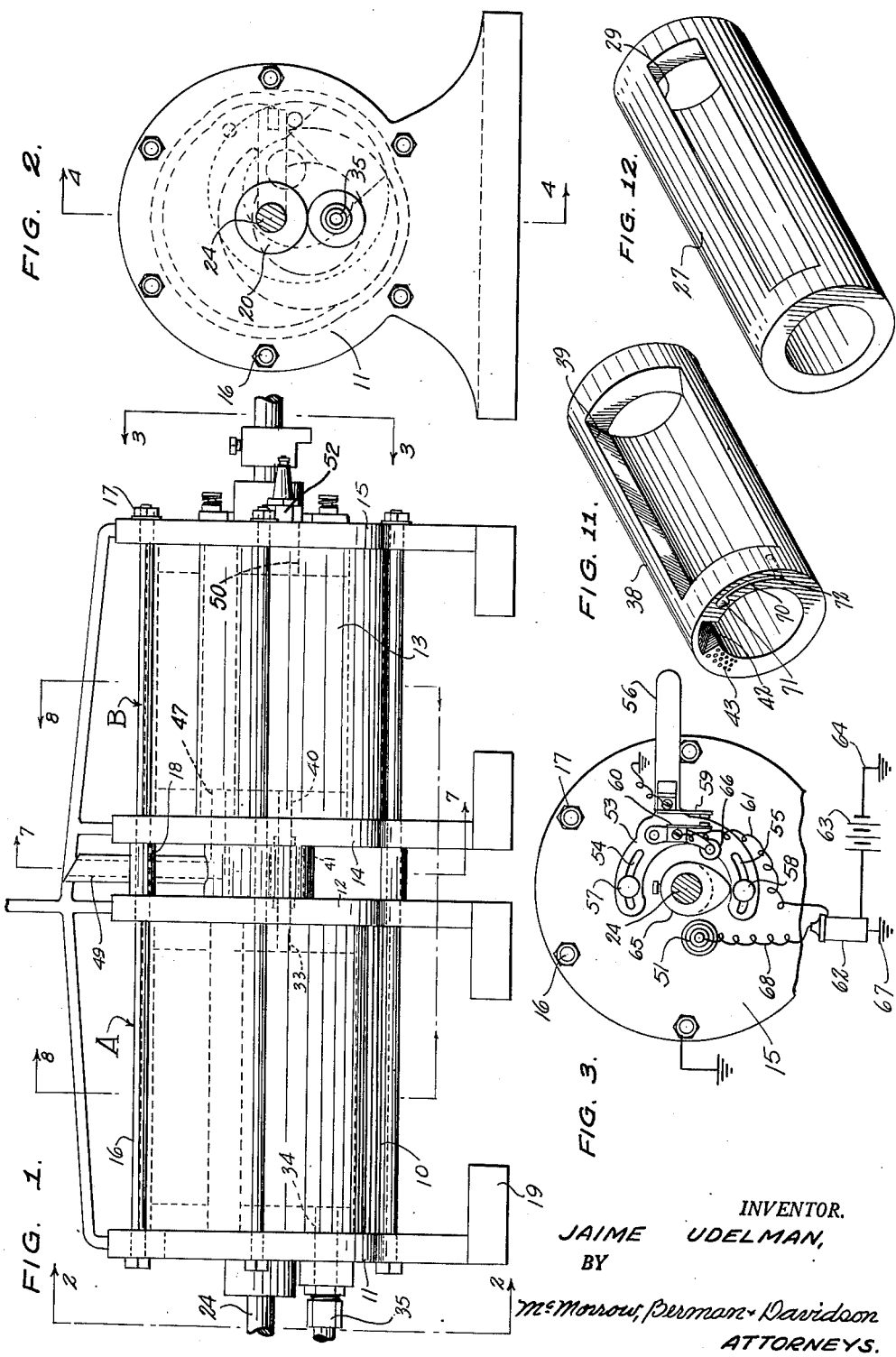
INVENTOR.
JAIME UDELMAN,
BY
McMorrow, Berman + Davidson
ATTORNEYS.

June 29, 1954
J. UDELMAN
2,682,258
ROTARY INTERNAL-COMBUSTION ENGINE
Filed April 3, 1951
3 Sheets-Sheet 2
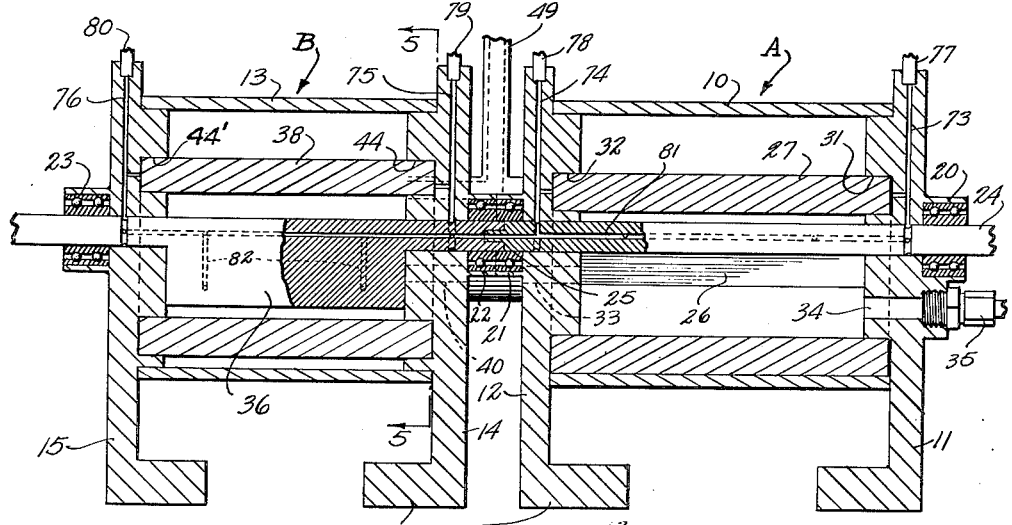
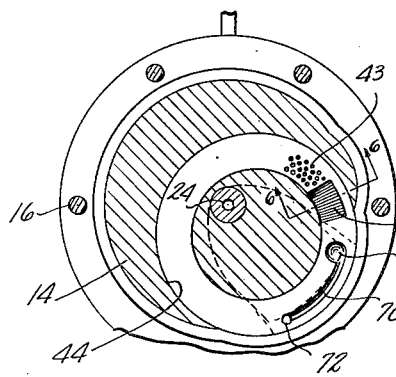
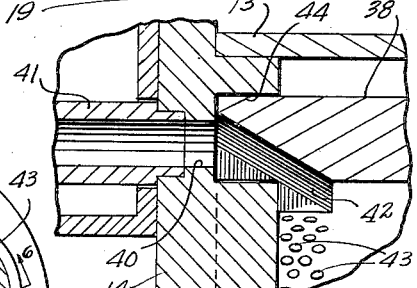
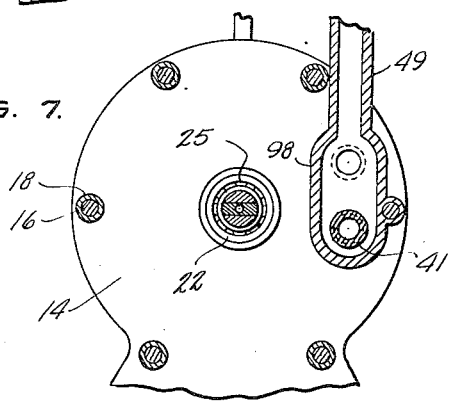
INVENTOR.
JAIME UDELMAN,
BY
McMorrow, Berman + Davidson
ATTORNEYS.

June 29, 1954  J. UDELMAN  2,682,258
ROTARY INTERNAL-COMBUSTION ENGINE
Filed April 3, 1951  3 Sheets-Sheet 3
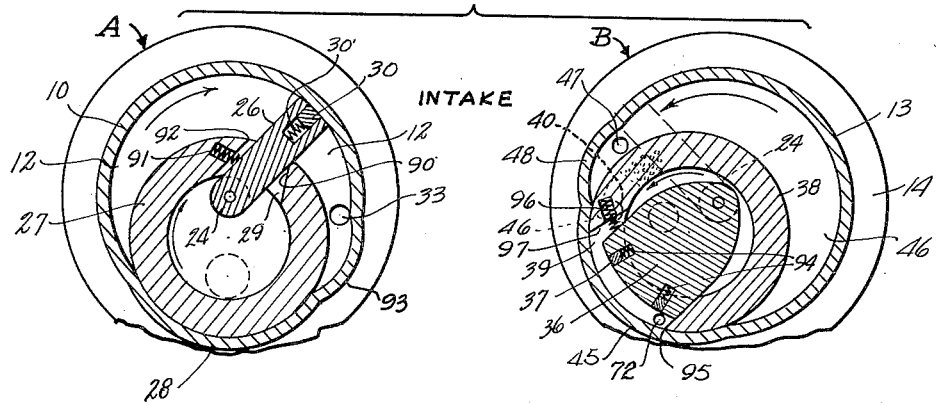
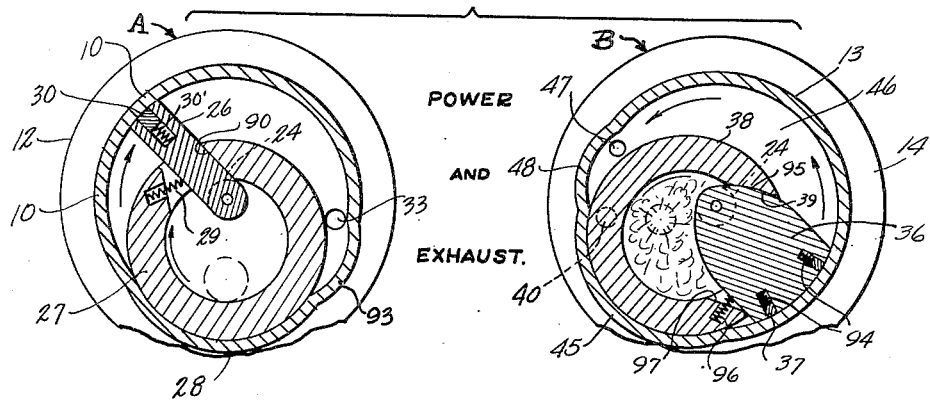
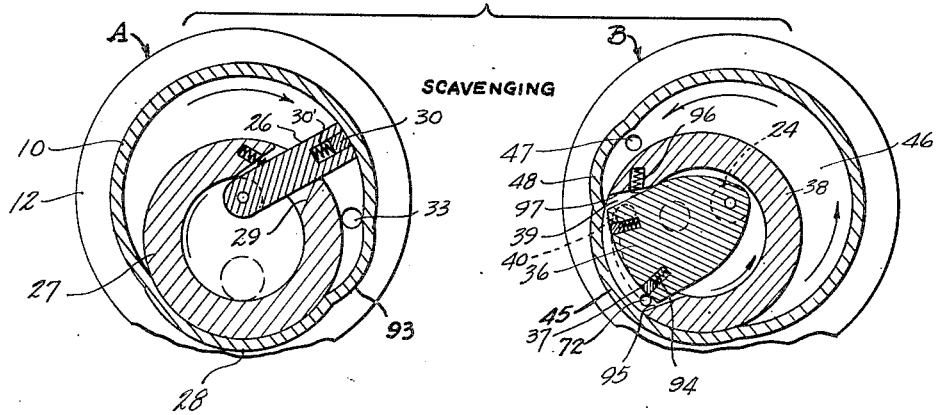
INVENTOR.
JAIME UDELMAN,
BY
McMorrow, Berman & Davidson
ATTORNEYS.

Patented June 29, 1954

2,682,258

UNITED STATES PATENT OFFICE 2,682,258

ROTARY INTERNAL-COMBUSTION ENGINE

Jaime Udelman, Cartago, Costa Rica

Application April 3, 1951, Serial No. 219,011

3 Claims. (Cl. 123—16)

This invention relates to rotary internal combustion engines, and more particularly to an improved rotary internal combustion engine of the type having separate compression and combustion sections.

It is among the objects of the invention to provide an improved internal combustion engine of the type indicated above, the moving parts of which are continuously rotatable in the same direction and through which the fuel mixture and combustion gases flow in substantially the same direction; which includes separate sections for compressing and burning the fuel mixture, the moving parts of such separate sections being rotated in unison in accordance with the cyclic operation of the engine; which provides a power stroke or cycle for each engine rotation and a large expansion of the combustion gases in comparison with the expansion in reciprocating-type internal combustion engines; which provides quick and positive valve action between successive cycles of engine operation; which is arranged to substantially eliminate leakage of air or gases past the moving parts of the engine during engine operation; which provides for high turbulence in the combustion chamber at the time of ignition of the combustible mixture therein and scavenging of the combustion chamber immediately before intake; which provides for the thorough lubrication of all bearing surfaces; and which is simple and durable in construction, economical to manufacture and effective and efficient in operation.

Other objects and advantages will become apparent from a consideration of the following description and the appended claims in conjunction with the accompanying drawings, wherein:

Figure 1 is a side elevational view of a rotary internal combustion engine illustrative of the invention;

Figure 2 is a transverse cross-sectional view on the line 2—2 of Figure 1;

Figure 3 is a transverse cross-sectional view on the line 3—3 of Figure 1;

Figure 4 is a longitudinal cross-sectional view on the line 4—4 of Figure 2;

Figure 5 is a transverse cross-sectional view on the line 5—5 of Figure 4;

Figure 6 is a fragmentary cross-sectional view on an enlarged scale on the line 6—6 of Figure 5;

Figure 7 is a transverse cross-sectional view on the line 7—7 of Figure 1;

Figure 8 shows related diagrammatic cross-sectional views of the compressor and combustion or power sections of the engine showing the vanes and rotors of the engine at positions they occupy while compressed air or combustible mixture is being transferred from the compression section to the combustion section of the engine;

Figure 9 is a diagrammatic cross-sectional view similar to Figure 8, showing the relative position of the vanes and rotors during the combined power and exhaust strokes of the engine;

Figure 10 is a diagrammatic cross-sectional view similar to Figures 8 and 9, showing the relative positions of the vanes and rotors during the scavenging cycle of the engine;

Figure 11 is a perspective view of the rotor of the combustion section of the engine; and Figure 12 is a perspective view of the rotor of the compression section of the engine.

With continued reference to the drawings, the engine comprises two sections generally indicated A and B, A being the compressor section of the engine, and B the combustion or power section. The section A has a main or outer cylinder 10, the opposite ends of which are closed by the end walls 11 and 12, and the unit B has a main or outer cylinder 13, the opposite ends of which are closed by end walls 14 and 15. The two sections are disposed in end-to-end relationship and in axial alignment with their adjacent ends spaced apart, and are held in this relationship against movement relative to each other by tie bolts 16 which are spaced apart at substantially equal angular intervals around the cylinders 10 and 13, and each of which extends through registering apertures in the four end walls 11, 12, 14 and 15. The heads of the bolts bear against the outer side of one of the outer end walls, and nuts, as indicated at 17, are threaded onto the opposite ends of the bolts and bear against the outer side of the other outer end wall. Spacer sleeves 18 surround the tie bolts between the inner end walls 12 and 14 of the sections A and B to hold these sections spaced apart.

A suitable base, such as the blocks 19, may be secured to the end walls of the sections A and B to support the engine in upright position with the longitudinal center lines or axes of the cylinders 10 and 13 substantially horizontal.

Each of the end walls is provided with an aperture or opening extending therethrough substantially coaxially of the main cylinders 10 and 13, and anti-friction bearings, as indicated at 20, 21, 22 and 23, are mounted on the outer sides of the end walls 11, 12, 14 and 15, respectively, with their bores in registry with the apertures in the corresponding end walls. A shaft 24 extends through the apertures in the end walls and is journaled in the anti-friction bearings for rotation relative to the cylinders 10 and 13 about an axis substantially coincident with the common axis of these two main cylinders.

The shaft 24 may be made in a single piece, or, if found more convenient, may be made in two pieces disposed in end-to-end relationship and joined together between the two inner end walls 12 and 14 by a torque transmitting connection, as indicated at 25.

A compression vane or piston 26 is disposed in the compression cylinder 10 and extends from the inner side of the end wall 11 to the inner side of the end wall 12 of this cylinder with one edge fixed to the shaft 24 and its other edge in sliding contact with the inner surface of the cylinder 10. A compression rotor 27 of hollow, cylindrical shape is disposed in the cylinder 10 eccentrically of the shaft 24 and surrounds this shaft and receives the compressor vane 26. The rotor contacts the inner surface of the main compression cylinder 10, and this main compression cylinder is provided at the location of the rotor 27 with an outwardly bulged portion 28 which extends around the rotor 27 for an arc of approximately 90° to provide a bearing surface and fluid seal between the outer surface of the rotor 27 and the inner surface of the main compression cylinder 10. The vane 26 is of flat, elongated, rectangular shape having its opposite faces substantially parallel to each other, and the rotor 27 is provided with a longitudinally extending slot 29 through which the vane 26 projects. At its edge remote from the shaft 24 the vane is provided with a longitudinally extending groove receiving a strip of packing material 30 to provide a fluid seal between this edge of the vane and the inner surface of the cylinder 10, and springs 30' are seated in recesses in the vane groove and bear against the packing strip to hold this strip in contact with the inner surface of the cylinder 10.

The end walls 11 and 12 of the cylinder 10 are provided in their inner sides with annular recesses 31 and 32, respectively, which receive the corresponding ends of the rotor 27 to mount the rotor in the cylinder 10 for rotation on an axis eccentric with respect to the shaft 24 and the cylinder 10.

With this arrangement, when the shaft 24 is rotated, the vane 26 will be turned around the inner surface of the cylinder 10 with its outer edge continuously in contact with the inner surface of the cylinder, except at the inner surface of the outward bulged portion 28, and the rotor 27 will be turned correspondingly and will remain in contact with the inner surface of the bearing portion 28 of the compressor cylinder 10. The leading side of the vane normally engages the edge 90 of the slot 29 of the rotor 27, and compression springs 91 mounted in recesses in the other edge 92 of the slot 29 and bearing against the trailing side of the vane, maintaining the vane in contact with the edge 90.

Supposing the shaft 24 to be rotated in a clockwise direction, as indicated by the arrows in Figures 8, 9 and 10, it will be seen that the vane 26 will be turned around the interior of the cylinder 10 and will turn the rotor 27, with the leading side of the vane in fluid sealing contact with the adjacent edge 90 of the slot 29. Under these conditions, air will be compressed from the left-hand end of the crescent-shaped space between the rotor 27 and the main cylinder 10, to the right-hand end of this space. A port 33 opens through the end wall 12 at the right-hand end of the space between the rotor 27 and cylinder 10, as illustrated in Figures 8 to 10, inclusive, and constitutes a portion of a transfer manifold through which compressed air is transferred from the interior of cylinder 10 to the interior of the rotor in the cylinder 13 of the combustion section B of the engine.

The cylinder 10 has a longitudinally extending, outwardly bulged portion 93 of small circumferential extent terminating at one side of the port 33 to insure the passage of the compressed air trapped in the bulged portion back into the cylinder during each rotation of the vane 26.

The outer end wall 11 of the cylinder 10 is provided with a fuel intake port 34 communicating with the interior of the rotor 27, and suitable fuel introducing means, such as a carburator 35, may be connected to the port 34 for supplying a fuel and air mixture to the interior of the rotor 27. As the rotor 27 and vane 26 are rotated in the clockwise direction indicated above, a vacuum is produced in the cylinder 10 behind the rotor at the left-hand or trailing side of the vane 26 so that air and fuel mixture will be drawn into this space from the interior of the rotor 27, through the space between the vane 26 and the edge 92 of the slot 29 of the rotor 27, so as to provide a charge to be ignited in a subsequent cycle of the engine.

A vane 36 is disposed in the cylinder 13 of the combustion section B and extends from the inner side of the end wall 14 to the inner side of the end wall 15, with one edge fixed to the portion of the shaft 24 between these end walls, and with its other or outer edge in sliding contact with the inner surface of the cylinder 13. This vane is provided in its outer edge with one or more longitudinally extending grooves receiving strips 37 of packing material providing fluid seals between the vane 36 and the inner surface of the corresponding cylinder 13, and springs 94 are disposed in recesses in the vane groove and bear against the packing strips to maintain the latter in firm contact with the inner surface of the cylinder 13. A rotor 38 of hollow, cylindrical shape is disposed in the cylinder 13 eccentrically of the shaft 24 and extends from one end to the other end of the cylinder in surrounding relationship to the vane 36. The rotor 38 has a longitudinally extending slot 39 therein through which the vane 36 projects, so that movement of the vane and the rotor relative to each other and radially of the cylinder 13 can take place as the vane 36 and the rotor 38 rotate. The vane 36 bears at one side against the edge 95 of slot 39 and springs 96 are disposed in recesses in the valve at the opposite edge 97 of the slot 39 to normally maintain the vane in fluid sealing engagement with the edge 95.

The inner end wall 14 of the cylinder 13 is provided with a port 40 in registry with the port 33, and a manifold tube 41 extends between the end walls 12 and 14 and connects the ports 33 and 40 for transferring a compressed fuel charge from the compressor cylinder 10 into the interior of the power rotor 38.

As shown in Figures 5 and 11, the combustion cylinder rotor 38 has in its end adjacent to the inner end wall 14 of the cylinder 13, a notch 42 whose radially outward side inclines longitudinally inwardly of the rotor 38 from a point in the end surface of the rotor near the periphery of the rotor to the inner surface of the rotor. A plurality of small ports 43 incline from the end surface of the rotor 38 to the interior surface of the rotor 38, and lead from the rotor end surface to the interior of the rotor, and are located at one side of the notch 42.

The cylinder end wall 14 is provided in its inner side with an annular recess 44 rotatably receiving the adjacent end of the rotor 38 and the outer cylinder end wall 15 is provided in its inner side with a similar annular recess 44' rotatably receiving the corresponding end of the rotor 38. The port 40 in the end wall 14 communicates with the notch 42 so that its inner end is covered by the adjacent end of the rotor 38. The rotor 38 thus normally closes the transfer port 40, and the air or fuel mixture compressed by the vane 26 in the cylinder 10 of the compressor section A cannot flow into the rotor 38, unless and until the notch 42 or the ports 43 are opposite the port 40.

When the rotor 38 is rotated to a position in which the notch 42 is opposite the port 40, the main portion of the combustible charge will be transferred from the section A through the port 40 and the notch 42 into the interior of the rotor 38. When the notch 42 has passed the port 40 and the small ports 43 are brought into registry with the port 40, an additional amount of compressed fuel charge will be injected into the interior of the rotor 38 at high velocity so as to create a high turbulence in the compressed charge in the rotor 38 so that the combustion of the charge when ignited is enhanced.

Referring to Figure 8, it will be observed that the bulged side wall portion 45 of the combustion cylinder 13, the inner surface of which is in contact with the periphery of the rotor 38, is angularly displaced approximately 45° from the corresponding bulged portion 28 of the compressor cylinder 10, and that the vanes 26 and 36 are spaced apart at an angular interval of approximately 180°. It will also be observed that the transfer of the fuel mixture to the combustion section B of the engine takes place when the vane 26 has approached a point near the port 33 in the compressor cylinder end wall 12, with the vane 36 opposite the bulged portion 45 of the combustion cylinder 13.

As illustrated in Figure 9, it will be observed that ignition takes place a short interval after the small ports 43 have passed the transfer port 40 and after the vane 38 has passed the bulged out portion 45 and is in contact with the inner surface of the cylinder 13 at the right-hand side of the portion 45. After the fuel charge has been ignited, the expansion of the combustion gases between the vane 36 and rotor 38 forces the vane 38 to rotate around the inner surface of the cylinder 13 about the axis of the shaft 24 carrying the rotor 38 around with it. The rotor 38 makes a fluid tight seal with the vane 36 at the side of the vane remote from the portion 45, while the vane 36 is slightly spaced from the opposite edge of the valve slot 39, so that the expanding gases can move from the interior of the rotor 38 into the end of the crescent-shaped space 46 between the periphery of the rotor 38 and the inner surface of the cylinder 13 and exert its pressure on the corresponding side of the vane 36 so as to cause the vane 36 to sweep around the cylinder 13 through this space.

In order to obtain a workable compression ratio for an internal combustion engine, such as a ratio of 7 to 1, it is necessary that the space in rotor 38 not occupied by vane 36 at the end of the compression cycle have a volumetric capacity of approximately one-eighth the volumetric capacity of the crescent-shaped space between the rotor 27 and the cylinder 10. For this reason the vane 36 is made thicker than the vane 26 and fills the major portion of the rotor 38 when this rotor is in its rotational position corresponding to the end of the compression and transfer cycle of the engine.

An exhaust port 47 is provided in the end wall 14 within the cylinder 13 and adjacent the transfer port 40, the exhaust port 40 being spaced from the aperture 40 in a direction away from the bulged out portion 45 of the cylinder 13.

With this arrangement, as the vane 36 is moved around the cylinder 13 by the expansion of combustion gases between the vane and the rotor 38, as explained above, the products of combustion of the preceding charge will be forced out of the space 46 through the exhaust port 47. The cylinder 13 is provided with a bulged out portion 48 of modified radius in longitudinal alignment with the exhaust port 47 to insure the passage of the compressed gas trapped in the bulged portion back into the cylinder during each rotation of the vane 36. An exhaust stack 49 is connected at one end to the end wall 14 in registry with the exhaust port 47 and projects radially outwardly of the engine between the end walls 12 and 14.

The exhaust stack 49 has a closed enlargement 98 at its inner end, which enlargement extends around and incloses the transfer tube or sleeve 41 to constitute a heat transfer chamber for heating the charge transferred through the tube 41 from the compression to the combustion unit of the engine by the heat of the exhaust gases.

A spark plug opening 50 is provided in the end wall 15 in registry with the interior of the rotor 38, and a spark plug 51, of conventional construction, is mounted in an internally screw-threaded boss 52 at the outer end of the aperture 50. Suitable mechanism controlling the supply of ignition current to the spark plug 51 is provided at the outer side of the end wall 15, as particularly illustrated in Figure 3, and may include a bracket 53 of semicircular shape mounted on the end wall to extend half-way around the bearing 23 and having longitudinally extending slots 54 and 55 near its opposite ends and a hand lever 56 projecting outwardly at a location intermediate the length of the semicircular bracket. Screws or pins 57 and 58 extend through the slots 54 and 55, respectively, and are secured to the end wall to adjustably mount the bracket on the end wall, and a grounded contact 59 is fixedly mounted on the bracket 53. A movable contact 60 is mounted on the contact and electrically insulated therefrom, and a conductor 61 connects this movable contact to one side of the primary circuit of an ignition coil 62, the other side of the primary circuit of the ignition coil being connected to the ungrounded or hot side of a source of electrical energy, such as the battery 63, the other side of which is grounded, as indicated at 64. A cam 65 is mounted on the shaft 24 and periodically engages a cam follower 66 on the movable contact 60 to close the contacts. The cam 65 is adjustable about the shaft 24, so that the ignition of the fuel charge in the rotor 38 will occur at the proper instant during the rotation of this rotor and the corresponding vane 36.

One side of the secondary coil of the ignition coil 62 is grounded, as indicated at 67, and the other side of this secondary coil is connected to the spark plug 51 by a conductor 68 to supply ignition current to the spark plug at the proper instant.

In order to provide lubrication for the moving parts of the engine, the end walls 11, 12, 14 and 15 are provided with radially extending oil channels, as indicated at 73, 74, 75 and 76, respectively, the outer ends of which at the peripheries of the corresponding end walls are connected to conduits, as indicated at 77, 78, 79 and 80, leading from the pressure side of a suitable lubricating oil pump, not illustrated. The shaft 24 is provided with a longitudinally extending channel 81, and with grooves at the locations of the channels in the several end walls, which grooves communicate with suitable ports with the channel 81 in the shaft. Channels, as indicated at 82, lead from the channel 81 in the shaft through the vanes 26 and 36 to the outer edges of the vanes, and branch channels from the channels 73, 74, 75 and 76 lead to the adjacent ends of the rotors 27 and 38. A suitable oil return or scavenging system may also be provided, if desired.

The engine may be either liquid cooled or air cooled, as may be desired, and no specific cooling apparatus has been illustrated, as a desired cooling system may be easily designed by anyone manufacturing the engine.

While a single compression and combustion unit has been illustrated and described, it is to be understood that the engine may be provided with multiple units which may be disposed in either end-to-end or side-by-side relationship, and that the engine may be provided in any desired size without in any way exceeding the scope of the invention.

As ignition systems of the character indicated are old and well known to the art, it is to be understood that various changes in the illustrated system may be resorted to without in any way exceeding the scope of the invention.

A circumferentially extending groove 70 is provided in the end of the rotor 38 adjacent the end wall 14, and this groove is located opposite the adjacent end of the slot 39 in the rotor. An enlargement 71 is provided at one end of the groove 70, and this enlargement is spaced from the notch 42 in the direction of rotation of the rotor, and an aperture or port 72 extends from the other end of the groove to the interior of the rotor 38.

The groove 70 is disposed entirely ahead of the notch 42 in the direction of rotation of the rotor 38, and provides the scavenging cycle of the engine. When the groove 70 reaches the port 40 in the end wall 14, a limited amount of air compressed in the cylinder 10 will flow from the cylinder 10 into the rotor 38, and this flow will continue as long as the groove 70 is in registry with the port 40 to blow any products of combustion out of the rotor 38 and into the space within the cylinder 13, and will not be mixed with the incoming charge of fuel mixture in the rotor 38.

The length of the groove 70 will be the minimum length necessary to provide the desired scavenging action, and, if desired, this groove and the aperture 72 may be omitted as the engine will operate without scavenging, although not as efficiently.

This rotary engine has numerous advantages over reciprocating type and similar engines in that it has a greater efficiency because of its high compression and substantially complete expansion of the products of combustion, a minimum number of basic parts of simplified construction, it is strictly rotary in operation and uses no pistons, spring loaded valves or crankshafts, it has a continuous intake of combustible mixture and the compressed charge is entirely free of products of combustion and not subject to preignition, its exhaust passage is open at all times and part of the heat of the exhaust gas is transferred to the incoming charge, its combustion charges are subjected to high turbulence at the time of ignition and its volumetric efficiency is higher than that of other types of engines.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a rotary internal combustion engine, a compressor section and a combustion section each including a cylinder and end walls closing the ends of the cylinders, means fixing said cylinders together in axial end-to-end relation, a shaft common to both of said sections and journaled through said end walls, a compressor vane in the compressor cylinder and extending between the end walls thereof, said compressor vane having one edge fixed to said shaft and another edge in sliding contact with the side wall of the compressor cylinder, a vane in the combustion cylinder extending between the end walls of the combustion cylinder, said combustion vane having an edge fixed to said shaft and another edge in sliding contact with the side wall of the combustion cylinder, a compressor rotor of hollow cylindrical shape rotatably mounted in said compressor cylinder eccentrically of and journaled on said shaft, the side wall of said compressor rotor having a longitudinal slot through which said compressor vane extends, the end walls of the compressor cylinder having recesses in which the ends of the compressor rotor are journaled, a combustion rotor of hollow cylindrical shape disposed in said combustion cylinder eccentrically of said shaft and journaled in said shaft, the side wall of said combustion rotor being formed with a longitudinal slot through which the combustion vane projects, the end walls of the combustion cylinder being formed with recesses rotatably receiving the ends of the combustion rotor, the side walls of said compressor and combustion cylinders being distorted to provide radially outwardly bulging portions engaging the periphery of the rotors, a manifold tube between and in communication with ports formed in the facing end walls of the cylinders and connecting the interior of the compressor rotor with the interior of the combustion rotor only in predetermined rotary positions of the rotors, a spark plug exposed in said combustion rotor, and ignition means operatively connected to said shaft for timing energization of the spark plug.

2. In a rotary internal combustion engine, a compressor section and a combustion section each including a cylinder and end walls closing the ends of the cylinders, means fixing said cylinders together in axial end-to-end relation, a shaft common to both of said sections and journaled through said end walls, a compressor vane in the compressor cylinder and extending between the end walls thereof, said compressor vane having one edge fixed to said shaft and another edge in sliding contact with the side wall of the compressor cylinder, a vane in the combustion cylinder extending between the end walls of the combustion cylinder, said combustion vane having an edge fixed to said shaft and another edge in sliding contact with the side wall of the combustion cylinder, a compressor rotor of hollow cylindrical shape rotatably mounted in said compressor cylinder eccentrically of and journaled on said shaft, the side wall of said compressor rotor having a longitudinal slot through which said compressor vane extends, the end walls of the compressor cylinder having recesses in which the ends of the compressor rotor are journaled, a combustion rotor of hollow cylindrical shape disposed in said combustion cylinder eccentrically of said shaft and journaled in said shaft, the side wall of said combustion rotor being formed with a longitudinal slot through which the combustion vane projects, the end walls of the combustion cylinder being formed with recesses rotatably receiving the ends of the combustion rotor, the side walls of said compressor and combustion cylinders being distorted to provide radially outwardly bulging portions engaging the periphery of the rotors, a manifold tube between and in communication with ports formed in the facing end walls of the cylinders and connecting the interior of the compressor rotor with the interior of the combustion rotor only in predetermined rotary positions of the rotors, a spark plug exposed in said combustion rotor, and ignition means operatively connected to said shaft for timing energization of the spark plug, said compressor and combustion rotors each having only one vane.

3. In a rotary internal combustion engine, a compressor section and a combustion section each including a cylinder and end walls closing the ends of the cylinders, means fixing said cylinders together in axial end-to-end relation, a shaft common to both of said sections and journaled through said end walls, a compressor vane in the compressor cylinder and extending between the end walls thereof, said compressor vane having one edge fixed to said shaft and another edge in sliding contact with the side wall of the compressor cylinder, a vane in the combustion cylinder extending between the end walls of the combustion cylinder, said combustion vane having an edge fixed to said shaft and another edge in sliding contact with the side wall of the combustion cylinder, a compressor rotor of hollow cylindrical shape rotatably mounted in said compressor cylinder eccentrically of and journaled on said shaft, the side wall of said compressor rotor having a longitudinal slot through which said compressor vane extends, the end walls of the compressor cylinder having recesses in which the ends of the compressor rotor are journaled, a combustion rotor of hollow cylindrical shape disposed in said combustion cylinder eccentrically of said shaft and journaled in said shaft, the side wall of said combustion rotor being formed with a longitudinal slot through which the combustion vane projects, the end walls of the combustion cylinder being formed with recesses rotatably receiving the ends of the combustion rotor, the side walls of said compressor and combustion cylinders being distorted to provide radially outwardly bulging portions engaging the periphery of the rotors, a manifold tube between and in communication with ports formed in the facing end walls of the cylinders and connecting the interior of the compressor rotor with the interior of the combustion rotor only in predetermined rotary positions of the rotors, a spark plug exposed in said combustion rotor, and ignition means operatively connected to said shaft for timing energization of the spark plug, said compressor and combustion rotors each having only one vane, the slots in rotor side walls being wider than the related vanes whereby the rotors can turn relative to the vanes, and spring means operating between one edge of the slots and the adjacent side of the vane and yieldably engaging the other side of the vane with the other edge of the slot so as to form a fluid seal between said other side of the vane and said other side of the slot, said spring means serving to normally space the said adjacent side of the vane from said one edge of the slot so as to provide a fluid passage therebetween normally providing communication between the interior of the related cylinder and the interior of the rotor associated therewith.

References Cited in the file of this patent

UNITED STATES PATENTS

| Number | Name | Date |
|---|---|---|
| 865,206 | Ranck | Sept. 3, 1907 |
| 973,833 | Wilber | Oct. 25, 1910 |
| 1,649,091 | Zimmer | Nov. 15, 1927 |
| 2,158,532 | Bullen | May 16, 1939 |
| 2,193,178 | Laythorpe | Mar. 12, 1940 |
| 2,511,441 | Loubiere | June 13, 1950 |
| 2,516,051 | Faitout et al. | July 18, 1950 |